United States Patent [19]
von Wedemeyer

[11] Patent Number: 5,479,717
[45] Date of Patent: Jan. 2, 1996

[54] LEVEL INDICATOR

[75] Inventor: Peter von Wedemeyer, Annweiler am Trifels, Germany

[73] Assignee: Stabila-Massgerate Gustav Ullrich GmbH, Germany

[21] Appl. No.: 179,098

[22] Filed: Jan. 10, 1994

[30] Foreign Application Priority Data

Jan. 10, 1993 [DE] Germany ............. 93 00 224.6 U

[51] Int. Cl.⁶ .................................................. G01C 9/02
[52] U.S. Cl. ............................ 33/379; 33/371; 33/451
[58] Field of Search ........................... 33/379, 367, 370, 33/371, 376, 377, 381, 382, 384, 451

[56] References Cited

U.S. PATENT DOCUMENTS

| | | | |
|---|---|---|---|
| 2,230,010 | 1/1941 | Owens | 33/379 |
| 4,653,193 | 3/1987 | Kennedy et al. | 33/379 |
| 4,979,310 | 12/1990 | Wright | 33/379 |
| 4,989,332 | 2/1991 | Worrallo | 33/451 |
| 5,063,679 | 11/1991 | Schwandt | 33/347 |
| 5,134,780 | 8/1992 | Butler et al. | 33/379 |
| 5,165,650 | 11/1992 | Letizia | 33/379 |

FOREIGN PATENT DOCUMENTS

| | | | |
|---|---|---|---|
| 585376 | 10/1959 | Canada | 33/347 |
| 1580167 | 7/1990 | U.S.S.R. | 33/379 |

*Primary Examiner*—Christopher W. Fulton
*Attorney, Agent, or Firm*—Ostrolenk, Faber, Gerb & Soffen

[57] ABSTRACT

To increase the slip resistance of level indicators, which comprise an elongate body, spirit level capsules inserted therein and protective end caps, the contact surface adjoining the measuring surface of the level indicator is provided with zones having a high coefficient of friction, for example by clipping on strips consisting of rubber, rubber like plastics material or felt. The strips are shaped to cause the body to incline so that the measuring surface is more toward the support which the contact surface faces.

22 Claims, 2 Drawing Sheets

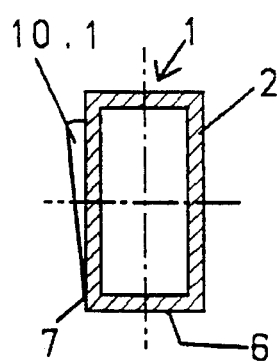
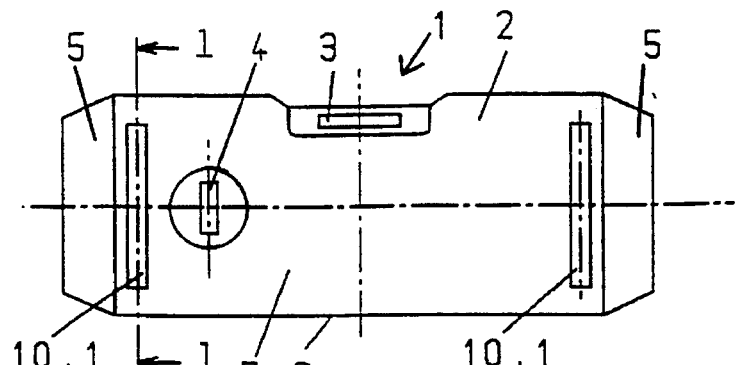
Fig. 1  Fig. 2
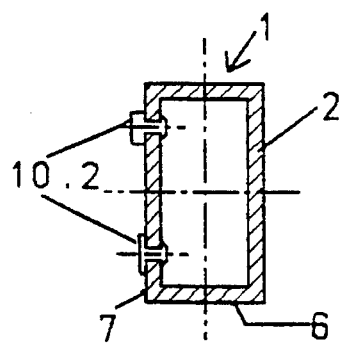
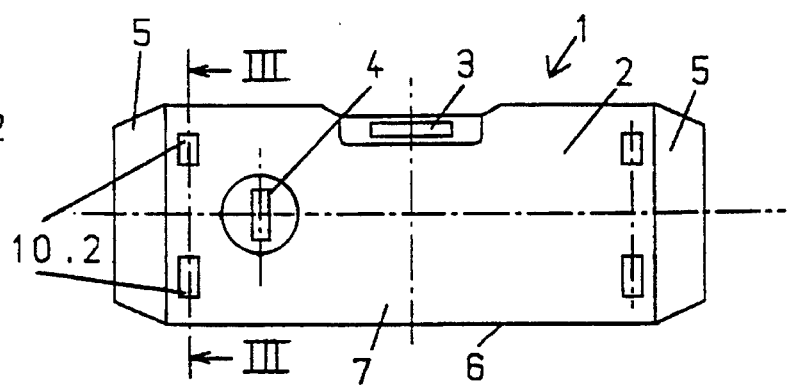
Fig. 3  Fig. 4
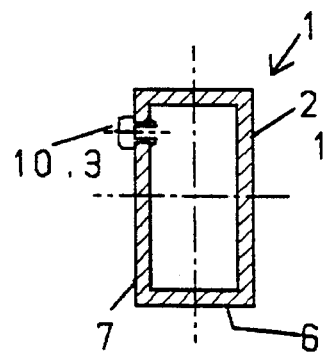
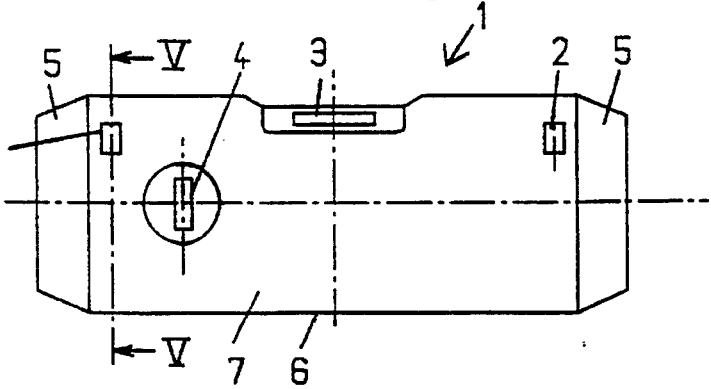
Fig. 5  Fig. 6
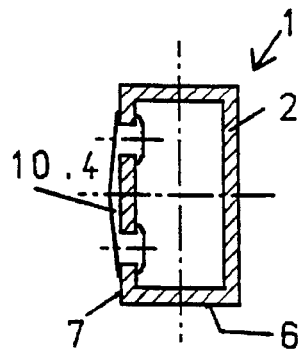
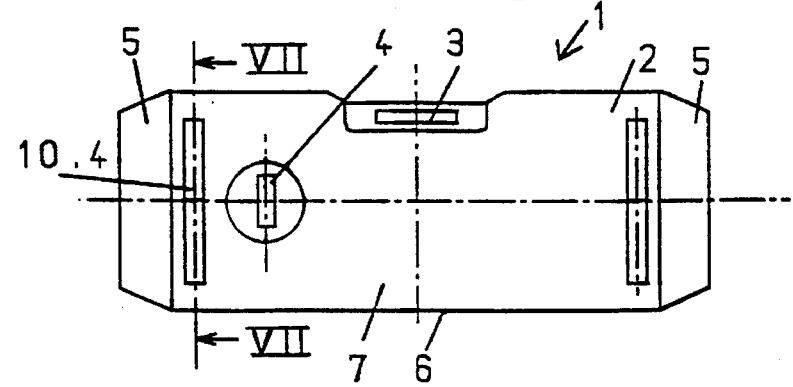
Fig. 7  Fig. 8

LEVEL INDICATOR

BACKGROUND OF THE INVENTION

The present invention relates to level indicators, and more particularly to the design of a level indicator for disposing the measuring surface of the indicator near to a surface to be measured. The level indicator comprises an elongate body, made mostly of metal, having spirit level capsules inserted therein and generally having two protective end caps, usually of plastics materials, and having an external measuring surface.

Level indicators of this type have been produced for decades in very large numbers and are regularly used in building construction.

When a workman wishes to use a level indicator to apply vertical or horizontal marking lines or markings, he presses the aligned level indicator against the support using one hand. With a pencil or a scriber held in the other hand, he endeavors to draw the line or marking. Experience has shown that the level indicator frequently deflects the pencil or scriber. This occurs to an increasing extent the greater is the length of the level indicator and the greater is the distance between the hands holding the indicator and the pencil or the scriber. In practice, the workman will ask for assistance so that two persons are then occupied in drawing a simple line or marking.

Of course, this situation has long been considered to be extremely unsatisfactory. However, a solution has not yet been found.

SUMMARY OF THE INVENTION

The present invention is based on the object of improving commercial level indicators such that lines or markings can be effected reliably and without difficulty even by one person.

This object is achieved with a level indicator of the type defined by providing the contact surface of the level indicator which intersects with the measuring surface, with zones having a high friction coefficient. The contact surface is the surface that engages a support, a wall, or the like.

With the present invention, the coefficient of friction between the level indicator and the support is increased. At the same time, a high surface pressure is achieved by somewhat point-like or thin, strip-like contact areas at the friction zones. Irregularities in the support surface are bridged because the means defining the higher friction zones project out of the contact surface of the indicator so that irregularities are received between the zones and the attachment of the level indicator to uneven and smooth surfaces is improved. Any danger of injury is excluded. Proper use of the level indicator is not impaired.

According to an advantageous development of the invention, rubber, rubber-like plastics materials or felt-like materials can be used as the friction zones to increase the coefficient of friction. For example, suitable materials are those used in the tire or shoe industry to produce long lasting, non-slip tires or soles.

According to a preferred development of the invention, parts comprised of a material having a high coefficient of friction are fastened to or on the level indicator. Accordingly, the existing components of the level indicator can still be used. It is not necessary for modifications or adaptations to be made for fastening of the parts that increase friction, depending on the type of fastening.

According to a first development of the invention, a burl coating is applied, and preferably adhered on or at the friction zones.

According to a second development of the invention, at least one longitudinal strip is applied to the contact surface to serve as the friction element.

According to a third development of the invention, at least two transverse strips are applied to the contact surface to serve as the friction element.

According to a fourth development of the invention, at least two cylinders are applied to the contact surface to serve as friction elements. Since the cylinders enclose a closed cavity, on flat supports they can act as suction means, thereby further improving the adhesion.

Preferably, the outer or contact surfaces are defined by the contact surfaces of the parts with a high coefficient of friction generally desk shaped or roof-shaped and are inclined with respect to the contact surface of the level indicator body. Alternately, the heights of the friction strips above the contact surface may be different from each other and are selected for inclining the level indicator with respect to the support. With correct dimensions of the friction applying means of the level indicator, the measuring contact surface, which follows the line or marking, is applied approximately against the support.

Advantageously, the friction strips or parts are clipped into the housing of the level indicator or into its end caps, and particularly into the end face of the end caps.

According to a variant, the parts are in the shape of a ring and are inserted into grooves extending around the housing or around the end caps.

According to a preferred development of the invention, the parts with a high coefficient of friction are secured in, at or on the end caps. In this way, the level indicator housing, in which the spirit level capsules are mounted, can remain entirely unaltered.

According to one development in this context, the high friction coefficient parts are also of such a size that they afford protection to the level indicator against impacts and against being dropped, by being designed as pads. Accordingly, they are provided with shock absorbing properties and are able to prevent damage upon being dropped. These additional parts and the grooves which receive them can be provided without additional cost.

According to one development in this context, the entire end face of the end caps is covered, preferably lined, and the impact on protection is improved by a corresponding projecting length of the friction strips projecting beyond the contact surface.

Finally, it is possible for the parts with a high coefficient of friction to be connected with the end caps in a multicolor and/or multicomponent injection molding process. This process is also suitable for economic production in view of the large batch quantities involved. Moreover, additional design and indicating effects can be achieved.

Other objects and features of the invention are described below with reference to the drawings.

BRIEF DESCRIPTION OF THE DRAWINGS

The invention will be illustrated in more detail and by way of example with reference to the drawings, wherein:

FIGS. 1 and 2 respectively show a section through and an elevational view of a first embodiment of a level indicator;

FIGS. 3 and 4 respectively show a section through and an elevational view of a second embodiment of a level indicator;

FIGS. 5 and 6 respectively show a section through and an elevational view of a third embodiment of a level indicator;

FIGS. 7 and 8 respectively show a section through and an elevational view of a fourth embodiment of a level indicator;

FIGS. 17, 18 and 19 respectively show an elevational view of, a plan view of, and a section through a first embodiment of an end cap;

FIGS. 20 21 and 22 respectively show an elevational view of, a plan view of, and a section through a second embodiment;

FIG. 23 shows a section through a third embodiment of an end cap;

FIG. 24 shows a view of fourth embodiment of an end cap;

FIG. 25 shows a view of fifth embodiment of an end cap, and

FIG. 26 shows a section through a sixth embodiment of an end cap.

DESCRIPTION OF THE PREFERRED EMBODIMENTS

Figure 9:
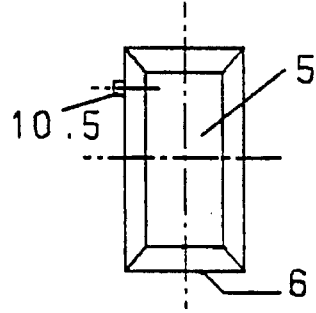
FIGS. 9 and 10 respectively show the same two views of a fifth embodiment.

FIGS. 1 and 2 show a section through and an elevational view of a first embodiment of a level indicator 1, comprising a parallepipedal, elongate body 2, made for example of light metal, which carries two spirit level capsules 3, 4 which extend at right angles to one another, two end caps 5 of relatively hard plastics material on the ends of the body and a measuring surface 6 which is situated at the side of the indicating body 2 which is opposite the spirit level capsule 3. The end caps are tapered in external profile outward from the body 2, having a generally frustoconical shape. Level indicators of this type are produced, purchased and used universally in large numbers. They are precision measuring instruments, and their surface is lacquered, coated or anodized.

Level indicators are used not only to check the alignment of existing structures but to an even greater extent to apply vertical or horizontal lines or markings to supports of any type. For this purpose, the workman places the level indicator 1 with one surface, i.e. the contact surface 7, which adjoins the measuring surface 6, on or against the support, and he draws a pencil or other scriber line along the measuring surface 6. To prevent inconvenient slipping of the level indicator 1 on the smooth support, the contact surface 7 of the body is provided with zones having a high coefficient of friction. The zones are particularly in the form of adhered on transverse friction strips 10.1. The strips are comprised, for example, of rubber, rubber-like plastics materials or felt-like materials. The transverse strips 10.1 are inclined in generally a desk-like manner or in an inclined plane so that the measuring surface 6 held at the bottom of the level reaches as closely as possibly up to the support on which the line or marking is to be applied.

FIGS. 3 and 4 show a modified embodiment. In this case, the transverse strips are in the form of short length strip sections 10.2. Irregularities in the surface of the support being measured can thereby be bridged over and compensated for more satisfactorily, i.e. can be received between the outwardly projecting strips. The four strip sections 10.2 are clipped into corresponding bores in the hollow body 2. The heights of the sections 10.2 above the surface 7 are greater at the top than at the bottom of the surface 7 for the same reason as the strips 10.1 are inclined.

FIGS. 5 and 6 show a further modified embodiment. In this case, only two short transverse strips 10.3 are provided, which are snapped into openings in the body 2 toward the top of the surface 7. In this variant the edge between the measuring surface 6 and the contact surface 7 is applied directly against the support.

FIGS. 7 and 8 show a fourth embodiment. Here long transverse strips 10.4 are provided, which are clipped into bores in the hollow body 2. These strips are shaped to be inclined roof-like so that the strips are highest off the contact surface 7 toward the center of the height of the surface 7, and the strips incline both toward the top and bottom surfaces of the body.

Figure 10:
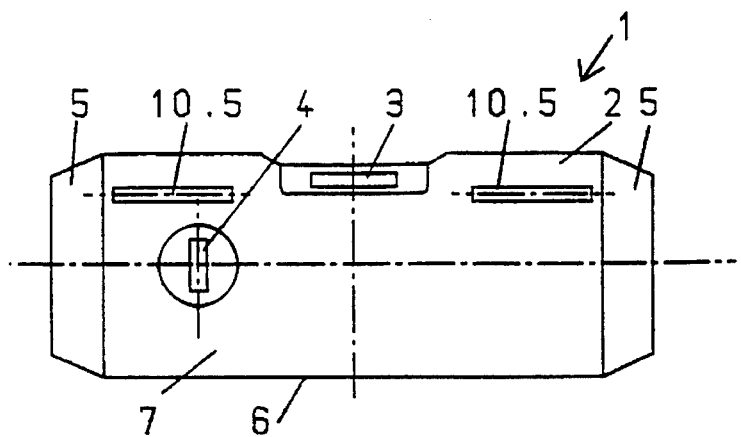

FIGS. 9 and 10 show a fifth embodiment. Here longitudinal strips 10.5 are fastened to the contact surface 7 near its top which causes the edge between the measuring surface 6 and the contact surface 7 to be applied directly against the support.

Figure 11:
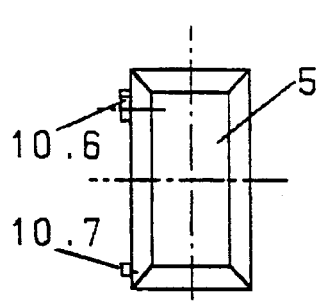
FIGS. 11 and 12 respectively show the same two views of a sixth embodiment.
Figure 12:
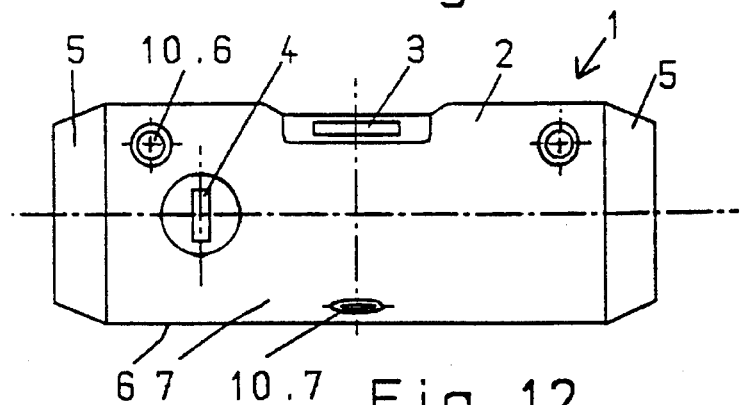

FIGS. 11 and 12 show a sixth embodiment. Here circular or ellipse-shape cylinders 10.6, 10.7 are fastened near the top and bottom of the contact surface 7. The cylinders act as suction means and thus enable the level indicator 1 to be secured to smooth supports. The top cylinders 10.6 are taller off the surface 7 than the bottom cylinders 10.7.

Figure 13:
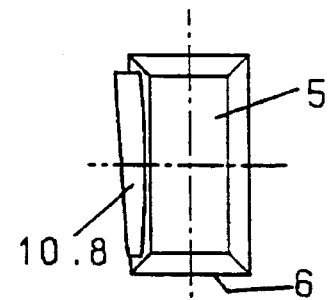
FIGS. 13 and 14 respectively show the same two views of a seventh embodiment.
Figure 14:
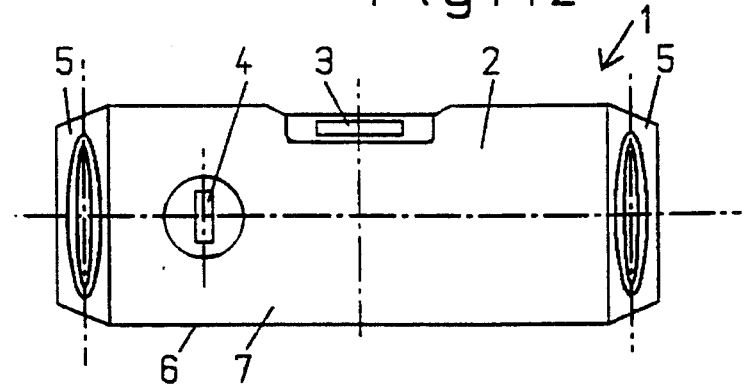

FIGS. 13 and 14 show a first example of the fastening of parts with a high coefficient of friction on the end caps 5. This embodiment shows cylinders 10.8 of elliptical cross-section, which may act as suction means.

Figure 15:
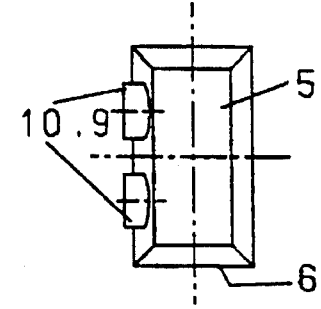
FIGS. 15 and 16 respectively show the same two views of an eighth embodiment.
Figure 16:
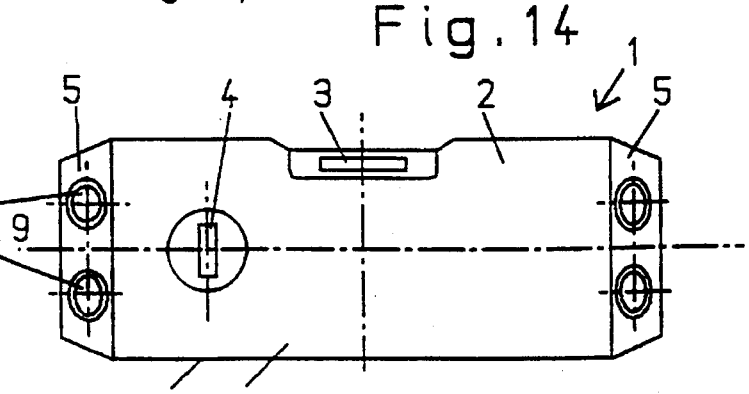

FIGS. 15 and 16 show a variant thereof with a total of four cylinders 10.9 as suction means on the end caps 5.

FIGS. 17 to 19 show an end cap 5 with a circumferential groove in which is placed a ring 10.10 comprised of the material with a high coefficient of friction. Short transverse strips 10.2 are formed integrally with the ring 10.10 and their surfaces are so inclined that the plane 9 connecting them forms an angle of, for example, 1 to 2 degrees with the contact surface 7 of the level indicator 1. This variant is especially suitable for production in a multicomponent injection-molding process.

FIGS. 20 to 22 show a further embodiment of an end cap 5. Here the part 10.11 having a high coefficient of friction and including integrally formed, short length, transverse strips 10.2 is clipped into the end face of the end cap 5. Owing to its generous dimensions, the part 10.11 can elastically withstand the level indicator being dropped on the ground and the part thus serves simultaneously to provide protection against being dropped and against impacts.

FIG. 23 shows a section through a further end cap 5, the end and side faces of which are covered by a snap-fitted, cap-shaped part 10.12 with a high coefficient of friction. This part 10.12 also serves simultaneously to provide protection for the indicator against being dropped and against impacts.

FIG. 24 shows an embodiment of an end cap 5 with a strip-shaped part 10.13 with a high coefficient of friction, which primarily serves as a contact surface.

FIG. 25 shows an embodiment of an end cap 5, in which a part 10.14 with a high coefficient of friction is in the form of a ring and is inserted into a circumferential groove 8.

Finally, FIG. 26 shows an embodiment of an end cap 5, in the end face of which is inserted a buffer part 10.15 with a high coefficient of friction and serving to provide protection against the indicator being dropped and against impacts. The buffer part has a transverse strip 10.1 for slip-free application on smooth supports. The buffer part 10.15 can be fastened on the end cap 5 not only by means of adhesion, welding, screwing or clipping but also by using a multi-component, in particular multicolor injection-molding process, whereby additional ornamental and/or indicating effects can be provided.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A level indicator comprising:

an elongate body defined by a plurality of surfaces including a measuring surface along which a measurement is made and a contact surface which intersects the measuring surface and which is adapted for facing toward a support;

the contact surface of the body having body zones thereon with a high coefficient of friction;

spirit level capsules supported on the body;

the body zones comprising a material with a high coefficient of friction, and means securing the material to the body; and wherein the material at the body zones is inclined with respect to the contact surface by about two degrees with respect to the contact surface.

2. The level indicator of claim 1, wherein the elongate body is generally of metal.

3. The level indicator of claim 1, wherein there is an end cap at each end of said body, and the end caps are protective end caps comprised of a plastics material.

4. The level indicator of claim 1, wherein the material at the body zones is in the form of at least one strip on the body and projecting from the contact surface of the level indicator said at least one strip including first and second portions, said first portion being closer to the measuring surface than said second portion is to the measuring surface, said second portion projecting further from said contact surface than said first portion projects from said contact surface.

5. A level indicator comprising:

an elongate body defined by a plurality of surfaces including a measuring surface along which a measurement is made and a contact surface which intersects the measuring surface and which is adapted for facing toward a support;

spirit levels capsules supported on the body;

an individual end cap at each end of said body, and wherein the end caps are protective end caps comprised of a plastics material;

wherein body zones comprising a material with a high coefficient of friction, and wherein the material is secured at the end caps; and wherein the material i sin parts so sized with respect to the body and the end caps as to protect the body against impact that will occur in the event the level indicator is dropped.

6. The level indicator of claim 5, wherein the end caps are generally frustoconically shaped, tapering out from the respective ends of the body at which the end caps are disposed.

7. The level indicator of claim 5, further comprising a burl coating applied to the body of the level.

8. The level indicator of claim 5, further comprising at least one longitudinal strip supplied on the body of the level.

9. The level indicator of claim 5, further comprising at least two transverse strips supplied on the body of the level.

10. The level indicator of claim 5, wherein the material at the body zones comprises at least two cylinder shaped parts.

11. The level indicator of claim 5, wherein the material at the body zones projects from the contact surface and is inclined with respect to the contact surface in a direction such that portions of the contact surface relatively near the measuring surface will be closer to the support than are portions of the contact surface that are more remote from the measuring surface.

12. The level indicator of claim 11, wherein the material at the body zones is inclined with respect to the contact surface by about two degrees with respect to the contact surface.

13. The level indicator of claim 5, wherein the material at the body zones is provided with outer surfaces that are inclined with respect to the contact surface by about two degrees with respect to the contact surface.

14. The level indicator of claim 5, wherein the end cap has an end surface outward of the body and a protective impact covering on the entire end surface of the end cap.

15. The level indicator of claim 5, wherein the material is in parts which are clipped into the level indicator, selectively in one of the body and the end caps.

16. The level indicator of claim 5, wherein the material parts are ring shaped; a circumferential groove being defined around the peripheries of the end caps, and the ring shaped material parts being installed in the grooves in the end cap.

17. The level indicator of claim 5, wherein the parts of a high coefficient of friction are connected with the end caps through a multi component injection molding process.

18. A level indicator comprising:

an elongate body defined by a plurality of surfaces including a measuring surface along which a measurement is made and a contact surface which intersects the measuring surface and which is adapted for facing toward a support;

spirit levels capsules supported on the body;

an individual end cap at each end of said body, and wherein the end caps are protective end caps comprised of a plastics material;

wherein body zones comprising a material with a high coefficient of friction, and wherein the surfaces of the body zones are inclined with respect to the contact surface by about two degrees with respect to the contact surface.

19. The level indicator of claim 18, wherein the material at the body zones project from the contact surface and is inclined with respect to the contact surface in a direction such that portions of the contact surface relatively near the measuring surface will be closer to the support than are portions of the contact surface that are more remote from the measuring surface.

20. The level indicator of claim 19, wherein the material at the body zones is inclined with respect to the contact surface by about two degrees with respect to the contact surface.

21. A level indicator comprising:

an elongate body defined by a plurality of surfaces including a measuring surface along which a measurement is made and a contact surface which intersects the measuring surface and which is adapted for facing toward a support;

the contact surface of the body having body zones thereon with a high coefficient of friction;

spirit level capsules supported on the body;

the body zones comprising a material with a high coefficient of friction, and means securing the material to the body; and wherein the material at the body zones projects from the contact surface and is inclined with respect to the contact surface in a direction such that portions of the contact surface relatively near the measuring surface will be closer to the support than are portions of the contact surface that are more remote from the measuring surface.

22. The level indicator of claim 21, wherein the material at the body zones is inclined with respect to the contact surface by about two degrees with respect to the contact surface.

* * * * *